(12) United States Patent
Keller et al.

(10) Patent No.: US 10,939,780 B2
(45) Date of Patent: Mar. 9, 2021

(54) BEVERAGE PREPARATION DEVICE AND OPERATING METHOD

(71) Applicant: EUGSTER / FRISMAG AG, Amriswil (CH)

(72) Inventors: Marco Keller, Roggwil (CH); Daniel Spycher, Feuerthalen (CH)

(73) Assignee: EUGSTER / FRISMAG AG, Amriswil (CH)

( * ) Notice: Subject to any disclaimer, the term of this patent is extended or adjusted under 35 U.S.C. 154(b) by 317 days.

(21) Appl. No.: 16/084,025

(22) PCT Filed: Nov. 24, 2016

(86) PCT No.: PCT/EP2016/078650
§ 371 (c)(1),
(2) Date: Sep. 11, 2018

(87) PCT Pub. No.: WO2017/157489
PCT Pub. Date: Sep. 21, 2017

(65) Prior Publication Data
US 2020/0237136 A1     Jul. 30, 2020

(30) Foreign Application Priority Data
Mar. 17, 2016    (DE) ................. 10 2016 104 972.7

(51) Int. Cl.
*A47J 31/00* (2006.01)
*A47J 31/44* (2006.01)
*B67D 1/08* (2006.01)

(52) U.S. Cl.
CPC ....... *A47J 31/4482* (2013.01); *A47J 31/4428* (2013.01); *B67D 1/0894* (2013.01)

(58) Field of Classification Search
CPC ................ A47J 31/4482; A47J 31/4428; A47J 31/4425; B67D 1/0894; B67D 1/0891
(Continued)

(56) References Cited

U.S. PATENT DOCUMENTS 5,161,455 A * 11/1992 Anson ................. A47J 31/4482
141/378
8,496,032 B2 * 7/2013 Miller .................. B67D 7/0288
141/362

FOREIGN PATENT DOCUMENTS

CH          706781 A2    1/2014
CN      201157060 Y    12/2008
(Continued)

OTHER PUBLICATIONS

International search report for patent application No. PCT/EP2016/078650 dated Feb. 13, 2017.
(Continued)

*Primary Examiner* — Reginald Alexander
(74) *Attorney, Agent, or Firm* — Bachman & LaPointe, PC

(57) ABSTRACT

A beverage preparation device (1), in particular a coffee machine, with a housing (2), an outlet (5) for discharging a beverage into a beverage container and a support element (6) for supporting the beverage container, said support element being arranged in a detachable manner in the insert openings (9, 10) which are arranged on the front side of the housing (4) and which are at variable distances to the outlet (5). The insertion openings (9, 10) are associated with closure means (12) for closing the insertion openings (9, 10) when the support device (6) is not inserted.

20 Claims, 3 Drawing Sheets

(58) Field of Classification Search
USPC .................. 99/284; 141/172, 378; 222/108
See application file for complete search history.

(56) References Cited

FOREIGN PATENT DOCUMENTS

| CN | 202051042 U | 11/2011 | |
|---|---|---|---|
| DE | 7915161 U1 | 8/1979 | |
| DE | 3903003 A1 * | 8/1990 | ............ A47J 31/103 |
| DE | 9109023 U1 | 11/1992 | |
| DE | 60104300 T2 | 8/2005 | |
| DE | 102008042177 A1 | 3/2010 | |
| DE | 102008042178 A1 | 3/2010 | |
| DE | 102013010110 A1 | 12/2014 | |
| EP | 1818881 A1 | 8/2007 | |
| EP | 2462849 A1 | 6/2012 | |
| EP | 2721974 A1 | 4/2014 | |
| WO | 2011154492 A1 | 12/2011 | |
| WO | 2012007313 A1 | 1/2012 | |

OTHER PUBLICATIONS

German office action for patent application No. 10 2016 104 972.7 dated Nov. 4, 2016.
Chinese office action for patent application No. 2016800835963 dated Dec. 4, 2020.

* cited by examiner

BEVERAGE PREPARATION DEVICE AND OPERATING METHOD

BACKGROUND OF THE INVENTION

The invention relates to a beverage preparation device, in particular a coffee machine, having a housing and having an outlet for pouring a beverage (prepared by means of the beverage preparation device) into a drinking container as well as having a rest device for setting down the drinking container below the outlet on a rest section of the rest device, said rest device being detachably arrangeable on a housing front side in insertion openings, which are distanced unequally to the outlet, in particular in a vertical direction, by means of an insertion section and being arranged with varying distances relative to the outlet.

Beverage preparation devices have become known, in which the outlet can be displaceable steplessly relative to a stationary rest device for a drinking container. Such a displacement device cannot be realized for all beverage preparation devices for reasons of cost and/or space.

Apart from this, displacement devices described in EP 1 818 881 B1, for example, are known, in which a rest device can be displaced relative to an outlet by means of motors.

Besides the aforementioned, technically fairly cumbersome principles for arranging a rest device for drinking containers (of different sizes) relative to an outlet with varying distances, principles have become known, in which the rest device can be inserted into insertion openings in the housing front side, said insertion openings being arranged one above the other along a vertical direction of the beverage preparation device, whereby a stepped distance variation to the outlet can be realized in a constructively simple and inexpensive manner. Such a displacement principle is described in DE 79 15 161 U1 or CH 706 781 A2. In the known coffee machine, a rest device can be fixed at different heights relative to an outlet, insertion openings, which are arranged one above the other and are shaped like slits, being provided for fixing the rest device in a vertical direction of the coffee machine. In the known beverage preparation device, the rest device moreover can also be determined in positions, which can be turned by 180° to each other, in the respective insertion opening in order to attain an even larger distance variability.

It has become known to fix a rest plate for a coffee pot in different insertion openings arranged one above the other in a housing front side in order to arrange the rest plate and thus the coffee pot with varying distances to a coffee filter.

For further states of the art, the documents DE 10 2008 042 177 A1, DE 10 2008 042 178 A1, EP 2 462 849 A1, DE 91 09 023 U1, EP 2 131 705 B1, DE 601 04 300 T2, WO 2011/154492 A1 and WO 2012/007313 A1 are referenced.

The beverage preparation devices having frontal insertion openings for detachably inserting a rest device have stood the test of time. However, it is seen as being disadvantageous that the unused insertion opening or the insertion openings into which a rest device is not inserted for longer periods of time tend to become dirty.

EP 2 721 974 A1 relates to a fully automatic coffee machine having a stationary rest device for mugs, i.e. the rest device cannot be displaced in height. The known fully automatic coffee machine comprises a side wall realized as a door, via which a brewing unit arranged in the housing interior is accessible for maintenance and/or cleaning purposes. Laterally at the bottom side, the known fully automatic coffee machine has a closable recessed grip for transporting the device.

SUMMARY OF THE INVENTION

Starting from the aforementioned state of the art, the object of the invention is therefore to improve a generic beverage preparation device having several insertion openings, which are arranged on a housing front side and serve for alternatively receiving a rest device, regarding its cleanability and/or its tendency to become dirty on the inside. Furthermore, the object is to indicated a suitable operation method of such an improved beverage preparation device.

Concerning the beverage preparation device, this object is attained by the features disclosed herein; this means that in a generic beverage preparation device, closing means (plate means or closing plates) are allocated to the insertion openings for closing the insertion openings when the rest device is not inserted.

Concerning the method, the object is attained by the features disclosed herein; this means that in a generic method, the rest device is removed from one of the insertion openings and this insertion opening is closed, preferably automatically, by means of the closing means and the rest device is detachably arranged in one of the insertion openings, preferably in the other insertion opening, while or after closing the insertion opening.

Advantageous embodiments of the invention are disclosed in the dependent clauses. All combinations of at least two or more features disclosed in the description, the claims and/or the figures constitute part of the scope of the invention.

In order to avoid repetitions, disclosed features relating to the device are also seen as relating to the method and are thus also claimable therefor. In the same manner, disclosed features relating to the method are also seen as relating to the device and are thus also claimable therefor.

The idea of the invention is to allocate closing means, which are separate from the rest device and which are preferably fixed to the housing and by means of which the respective insertion opening not occupied by a rest device, as will be described further on, can be closed or faced, preferably automatically, to the first and the at least one other second insertion opening in a beverage preparation device, in which the rest device can be arranged at different defined heights (distances) relative to an outlet in a housing front side, which preferably cannot be adjusted in height, in which the rest device can be received in a first and at least a second insertion opening using an insertion section, said second insertion opening preferably being shaped like a slit and being arranged at a different distance from the outlet. In other words the, preferably circumferentially closed, insertion openings, i.e. preferably limited by an opening edge, which entirely surrounds the respective insertion opening and is formed in particular by the housing, for alternatively receiving the rest device in the event that the rest device is not inserted in said insertion opening can be closed by means of closing means of the beverage preparation device so that it is safely prevented that dirt gets into the insertion openings on the housing front side. The provision according to the invention of corresponding closing means in the scope of a beverage preparation device, e.g. a portion unit machine comprising an injection device for supplying water in a portion unit machine, such as a capsule machine or a fully automatic coffee machine, moreover yields an appealing design since the open insertion openings of known machines found to be aesthetically unpleasing are not found to be aesthetically pleasing.

Preferably, the closing means comprise closing elements (closing panels), which have one or more pieces and which are allocated to insertion openings and which can be displaced between a respective opening position, which is preferably arranged within the housing, and a respective closing position, in which they close the respective insertion opening, preferably flush with the housing front side. In other words, a closing element is allocated to each insertion opening, said closing element being able to be displaced between two defined positions, namely an opening position and a respective closing position closing the respective insertion opening. In this context, the closing elements are preferably attached in each of the two positions as well as on the displacement path therebetween directly or indirectly to the housing of the beverage preparation device, preferably in its interior. Particularly preferably the closing elements are realized and arranged such that, via an insertion process of the rest device, a respective closing element is displaced in the respective insertion opening by applying force by means of the rest device from the closing position towards the respective opening position, preferably all the way into the opening position. In this manner, a separate drive, which can be alternatively provided, for opening a respective insertion opening can be omitted.

One embodiment variation has proven particularly advantageous in which drive means, preferably energy storage means, are allocated to the closing elements, which automatically displace or automatically apply a closing force to the closing elements when and/or after removing the rest device from the respective insertion opening towards the respective closing position, preferably all the way to the closing position. By allocating corresponding drive means to each closing element, an automatic closing of all insertion openings can thus be ensured.

In regard to the specific realization of the energy storage means, different possibilities are available. It is thus conceivable, for example, to use elastomer elements, for example made of plastic. Additionally or alternatively thereto, classic springs, for example made of metal or another material, can also be used, for example torsions springs or leaf springs, in particular when integrating the closing elements in flaps. The use of classic helical compression springs is also possible, in particular in a translationally displaceable (moveable) arrangement of the closing elements.

It has proven to be particularly advantageous to the invention if the drive means are realized such that they apply force to the closing elements even after attaining the closing position, i.e. when in the closing position, in order to retain the closing elements in the closing position, in particular to prevent the closing means from accidentally opening due to vibrations during the operation of the beverage preparation device without inserting a rest device in the respective insertion opening and/or in order to attain an exact positioning of the closing elements in the respective closing position, which is of advantage in particular when the closing elements are aligned flush with their housing front side (front panel) when in their respective closing position, i.e. in particular do not protrude over the housing front side or are at a backward offset. Via this, on the one hand, the aesthetic impression of the beverage preparation device can be improved and, on the other hand, the risk of dirt getting into the coffee machine is further reduced.

Additionally or alternatively to the afore-described embodiment variation, it is possible to allocate securing means, in particular permanent magnet means and/or locking means, to the closing elements of the closing means in order to position the closing means in a defined force-fit manner and/or to retain them in the respective closing position. Preferably, the permanent magnet means and/or the locking means apply a respective closing force to the closing elements even after attaining the closing position. In particular providing permanent magnet means enables an embodiment variation without the aforementioned drive means, in particular in the form of energy storage means. It is thus conceivable, for example, that the closing elements, in particular in a respective integration into a flap, are displaced towards the closing position purely via gravity when removing the rest device from the respective insertion opening, said permanent magnet means being able to be realized and arranged such that they support the closing movement, in particular on a last section of a path, via a corresponding magnetic force impact, i.e. they apply a force to the closing element in the corresponding closing position and/or retain or secure the closing element in the closing position.

In regard to the movement sequence or the movement path, which the closing elements travel between their respective opening position and their respective closing position, there are different possibilities of realizing this. It can be implemented, for example, to guide the closing elements in a translationally displaceable manner or, alternatively, to arrange them pivotally. A composed translational-rotational movement can also be realized, for example by providing a corresponding slide guide.

In a pivotal arrangement of the closing elements, it has proven to be particularly advantageous to design the closing elements as components of a respective flap, which can be arranged in its closing position above or below the insertion opening or, as an alternative, laterally thereto depending on the securing location, in particular joint connection position, and pivoting direction. Generally it is conceivable to provide several flaps per insertion opening, which interact like saloon doors, for example, and each only close a partial section of the free opening cross section of the insertion opening. It is preferred, however, to provide a single flap per insertion opening. It is generally conceivable to arrange all flaps above or alternatively below the insertion opening in their respective closing position. It is also conceivable to arrange a closing element in its closing position above the insertion opening and at least one other closing element below the insertion opening.

It is particularly preferred if the insertion openings, which preferably have an identical opening cross section (though this is not mandatory), are arranged one above the other in a vertical direction extending perpendicular to an installation surface (base surface) of the beverage preparation device and being vertical when the installation surface is arranged horizontal, two adjacent insertion openings each preferably being distanced from each other via a housing section. In this context, it is particularly preferred if the insertion openings are surrounded by an opening edge which is formed by the housing front side. In other words, the free opening cross sections of the insertion openings are or extend preferably in a plane extending perpendicular to the installation surface. It is of an overall advantage if the insertion openings extend into the housing so that a rest device can be inserted or guided into the housing in sections in order to be detachably arranged on the housing.

It is generally conceivable to fix the rest device in an insertion opening only by inserting a fixing or insertion section into an insertion opening, it being preferred if the (rest) section protruding over the housing front side undertakes a downward tilting effect of the protruding section in order to clamp the rest device in an insertion opening. It is particularly preferred if each insertion opening has a device for rearward engagement allocated to them which can be engaged from behind from the bottom upward preferably with respect to a vertical, in particular via an afore-described tilting effect of the rest device in the interior of the housing, in order to secure the rest device against a simple straight removal. In the instance of providing a corresponding device for rearward engagement, the rest device has to be tilted towards the outlet preferably by its protrusion protruding forward so that the rest device is released of the device for rearward engagement and can then be removed frontward from the insertion opening.

It has proven to be particularly advantageous to the invention if the rest device not only forms a rest surface for a drinking container (which does not belong to the beverage preparation device) but is simultaneously formed like a drip tray in order to be able to catch a dripping beverage, an overflowing beverage and/or water from a facultative rinsing process of the beverage preparation device. By removing the rest device, the drip tray is simultaneously removed from the housing and can be emptied.

It has proven to be particularly advantageous to the invention if a housing-front-side section, which comprises at least some of the insertion openings, preferably all insertion openings, along with the respective closing means, is realized is a component of a housing drawer, by means of which a collection bin for pomace or capsules, which can be realized on, be fixed to or detachably arranged on the housing drawer, can be removed from the housing so as to be emptied and/or cleaned. Depending on the design of the beverage preparation device, pomace or alternatively capsules or other serving size according to a beverage-making process can be directly caught in the housing drawer.

The invention also relates to a method for operating a beverage preparation device according to the invention, it being intended according to the invention that after removing the rest device from one of the insertion openings and after (at least partially) closing said insertion opening by means of the closing means, the rest device is inserted into the same or alternatively a different insertion opening, preferably while simultaneously opening the insertion opening, in particular by displacing a corresponding closing element (closing panel) of the closing means.

BRIEF DESCRIPTION OF THE DRAWINGS

Further advantages, features and details of the invention can be derived from the following description of preferred exemplary embodiments as well as from the drawings.

In the following.

DETAILED DESCRIPTION

Figure 1:
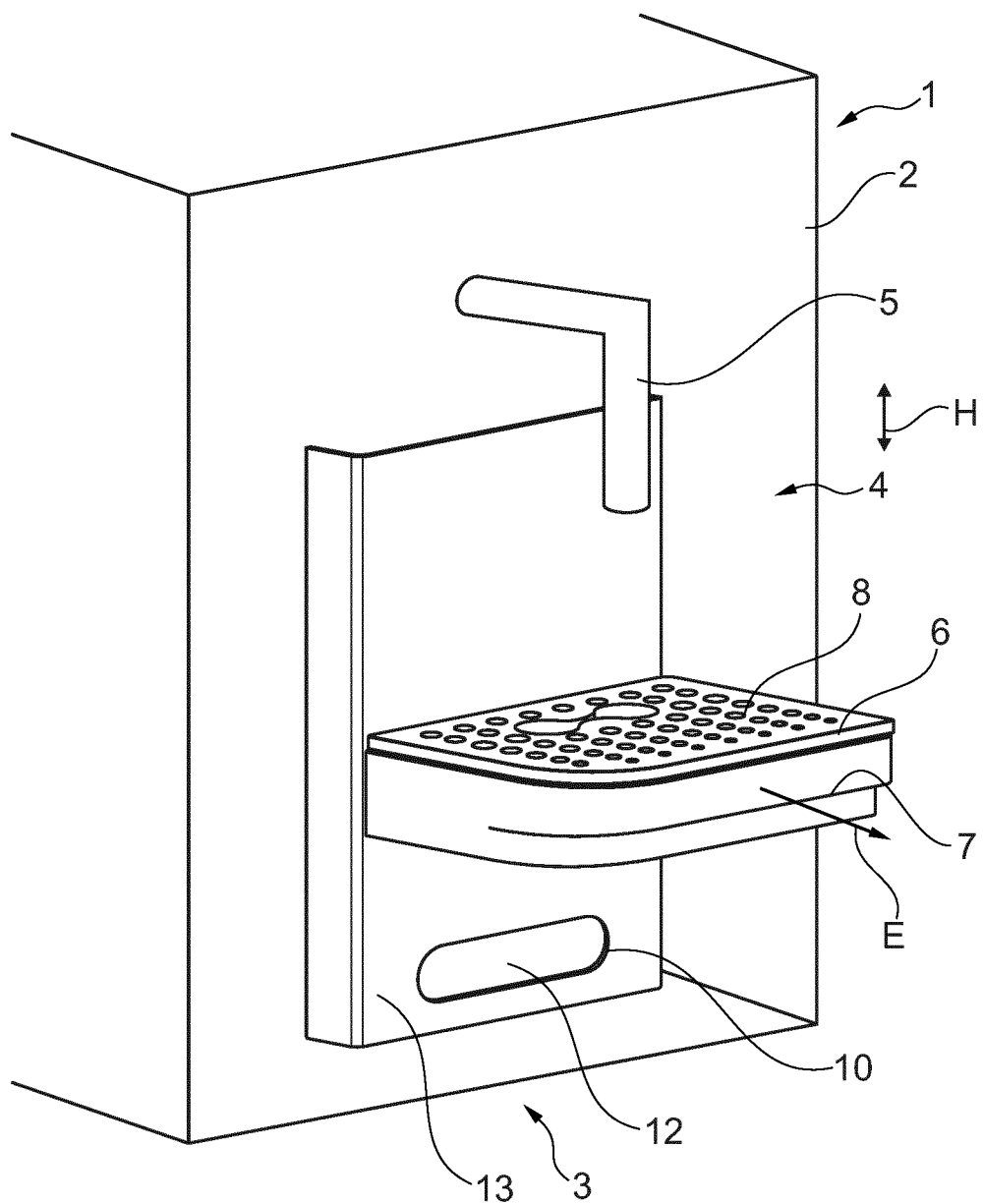
FIG. 1 illustrates an inclined view on the front of a housing front side of a beverage preparation device realized according to the concept of the invention.

In the figures, the same elements and elements having the same function are referenced with the same reference numerals.

In FIG. 1, an exemplary beverage preparation device 1 is illustrated, realized as a coffee capsule machine. The beverage preparation device 1 comprises a housing, which defines an (lower) installation surface 3 directly or via feet (not illustrated), said installation surface 3 generally being oriented horizontal. A housing front side 4 (housing front wall) extends perpendicular to the installation surface 3 in a vertical direction H, which extends perpendicular to the installation surface 3 and is generally oriented vertical. In an area in front of the housing front side 4, an outlet 5 is arranged for a beverage, in this example coffee, made using the beverage preparation device 1. Via the outlet 5, the beverage can flow into a drinking container (not illustrated), for example a mug, a glass or a cup, which is arranged on a rest device 6 in an area below the outlet 5. In the illustrated exemplary embodiment, the rest device 6 comprises a drip tray 7 and drip or installation grid 8, which covers the drip tray 7 and on which the drinking container can be set.

The rest device 6 can be positioned in different positions (exactly two in this example) relative to the outlet 5, in which positions the rest device 6 is distanced from the outlet 5 in varying distances in the vertical direction H. The rest device 6 specifically is in an exemplary upper position, which is defined by a first insertion opening 9 in the housing front side 4, said first insertion opening 9 being illustrated in FIG. 2 and being covered by the rest device 6 in FIG. 1, and alternatively thereto is in a second or lower position, which is defined by a second insertion opening 10 in the housing front side. For changing the height or for changing the distance of the rest device 6, more precisely an insertion section of the rest device 6, which protrudes into the housing and preferably reaches through the housing front side, relative to the outlet 5, the rest device 6 only has to be pulled out of the first insertion opening away from the housing 2 in a removal direction E, i.e. essentially perpendicular to the surface extension of the housing front side 4, and be inserted into the second insertion opening 10. The insertion openings 9, 10 are elongated perpendicular to the vertical extension H of the housing 2 and are shaped like slits. From FIG. 1 and FIG. 2 it can be seen that the two insertion openings 9, 10 are distanced from each other via a housing area 11 in the vertical direction H.

Figure 3:
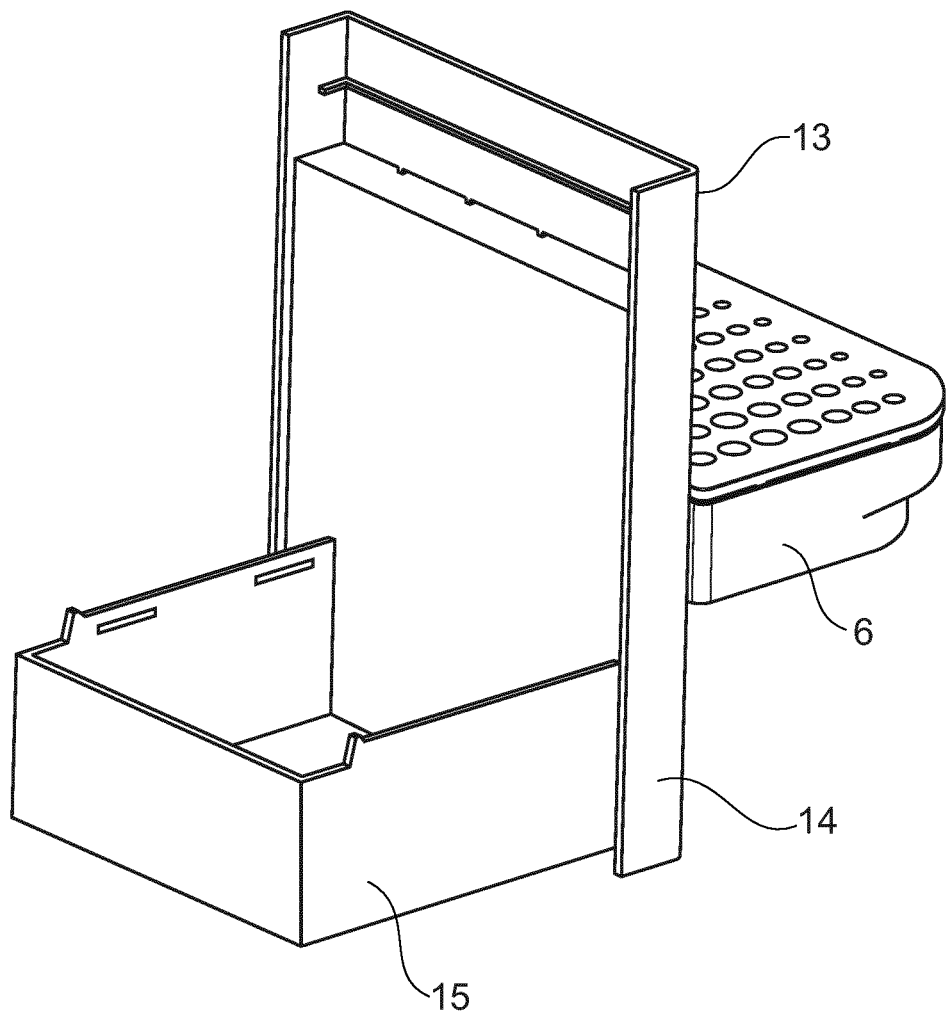
FIG. 3 illustrates the housing-front-side section according to FIG. 2 in a view from the interior or rather from behind in the design as a collection bin for pomace or serving sizes, in particular a housing drawer comprising capsules.

From FIG. 1 it can be seen that the second, in this exemplary instance lower, insertion opening 10, which is not occupied by the rest device 6, is closed by means of closing means 12 of the beverage preparation device 1, said closing means 12 being separate from the rest device 6 and being arranged flush in a frontal housing surface section 13. In this specific exemplary embodiment, as yielded in particular from FIG. 3, the housing surface section 13 is formed by a housing drawer 14, which is inserted from the front into the housing 2 and carries or comprises on its back side a collection bin 15, for coffee capsules in this exemplary embodiment which can fall into the collection bin 15 after a beverage-making process has taken place.

Figure 2:
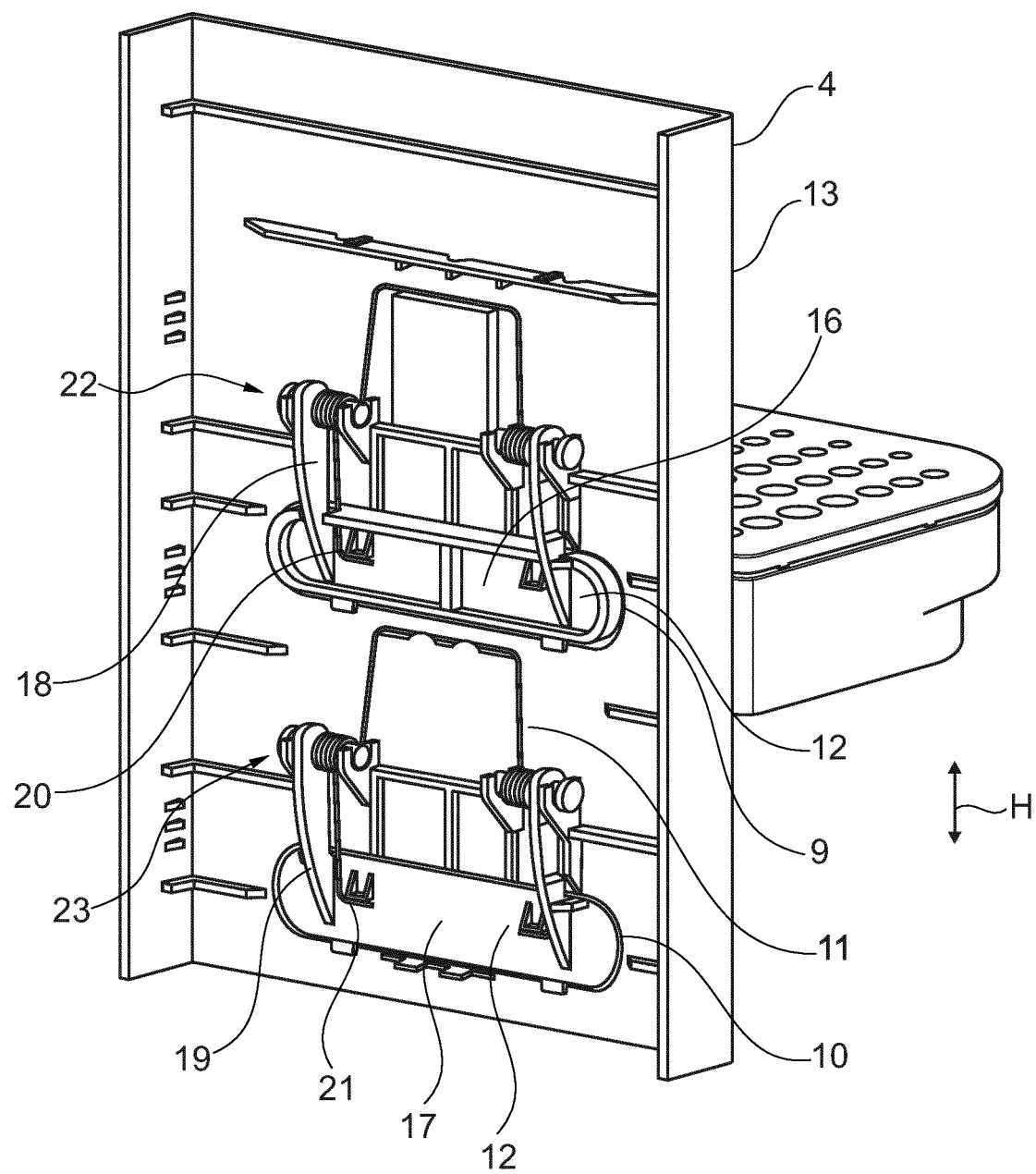
FIG. 2 illustrates a housing-front-side section comprising insertion openings in a view from behind or rather from the housing interior.

From the rearview according to FIG. 2 it can be seen that the closing means 12 comprise a first closing element 16 allocated to the first insertion opening 9 as well as a second closing element 17 separate thereto and allocated to the second insertion opening 10. In the specific exemplary embodiment, both closing elements 16, 17 are components of a flap, more precisely a first and a second flap 18, 19, respectively, which are jointed to the housing 2, to the housing front side 4 from the back in this instance.

In the illustration according to FIG. 2, both closing elements 16, 17 are in a closing position, which is only correct for the lower or second closing element 17 from an illustrative point of view since only the second insertion opening 10 is closed by the second closing element 17. In a correct view, the first closing element 16 would have to be in an opening position pivoted inward with respect to the illustrated closing position since the rest device 6 protrudes into the first insertion opening 9 perpendicular to the vertical direction H and is detachably fixed therein, in particular clamped therein by being tilted.

It can be seen that both closing elements 16, 17 can be displaced, pivoted in this instance, from the closing position to the opening position contrary to the spring force of energy storage means 20, 21, which are each realized as spring clips each comprising two torsion-spring sections in this specific exemplary embodiment, which support themselves on one end in the interior of the housing front side 4 (housing front wall) as well as on the respective closing element 16, 17 on the rear side and which apply a spring force to the respective closing element in the illustrated closing position.

In the specific exemplary embodiment, the closing elements 16, 17 can be displaced, or pivoted in this instance, to the opening position by inserting the rest device 6 into the respective insertion opening 9, 10 and by applying a resulting displacement force by means of the rest device 6 itself, said opening position being above the respective insertion opening 9, 10 in this specific exemplary embodiment. Alternatively thereto, the pivoting direction of both locking elements 16, 17 can be oriented downward or one of the closing elements 16, 17 can be pivoted upward and a different closing element 16, 17 can be pivoted downward. In the specific exemplary embodiment for example, the respective joint connections 22, 23 are each above the respective insertion opening 9, 10.

In order to displace the rest device 6 from the illustrated relative position to the outlet 5 having a smaller distance to the lower position with a greater distance, the rest device 6 first has to be removed from the first insertion opening 9. In the meantime, the first locking element 16 pivots from the opening position (not illustrated) downward, for example, to the closing position (already illustrated), whereupon the rest device 6 is inserted into the second insertion opening 10 and the second closing element 17 pivots upward, in this specific embodiment, to the respective opening position by being subjected to a displacement force.

The invention claimed is:

1. A beverage preparation device (1), in particular a coffee machine, having a housing (2) and having an outlet (5) for pouring a beverage into a drinking container as well as having a rest device (6) for setting down the drinking container, said rest device (6) being detachably arrangeable on a housing front side (4) in insertion openings (9, 10), which are distanced unequally to the outlet (5), and being arranged with varying distances relative to the outlet (5) wherein
the insertion openings (9, 10) are allocated to closing means (12) for closing the insertion openings (9, 10) when the rest device (6) is not inserted.

2. The beverage preparation device according to claim 1, wherein the closing means (12) comprise closing elements (16, 17), which are allocated to the insertion openings (9, 10) and are displaceable between a respective opening position and a respective closing position, in which the closing elements (16, 17) close the respective insertion opening (9, 10).

3. The beverage preparation device according to claim 1, wherein the closing means (12) comprise driving means allocated to the closing elements (16, 17) in order to automatically move the closing elements (16, 17) towards the respective closing position when extracting and/or after having extracted the rest device (6) from the respective insertion opening (9, 10).

4. The beverage preparation device according to claim 3, wherein the driving means are designed so as to exert a closing force on the closing elements (16, 17) when in the closing position.

5. The beverage preparation device according to claim 2, wherein the closing means (12) comprise fastening means allocated to the closing elements (16, 17) in order to accurately position and/or hold the closing elements (16, 17) in the respective closing position.

6. The beverage preparation device according to claim 2, wherein the closing elements (16, 17) are arranged so as to be translationally movable or pivotal between the respective opening position and the respective closing position or so as to be movable in a combined translational and rotatable movement.

7. The beverage preparation device according to claim 2, wherein the closing elements (16, 17) are part of a respective flap (18, 19).

8. The beverage preparation device according to claim 1, wherein the insertion openings (9, 10) are arranged one above the other in the housing front side (4) in a direction (H) extending perpendicular to an installation surface (3).

9. The beverage preparation device according to claim 1, wherein a device for rearward engagement is allocated to the rest device (6) in order to fasten the rest device (6) in the insertion opening (9, 10) against a purely straight removal movement.

10. The beverage preparation device according to claim 1, wherein the rest device (6) is realized as a drip tray having an installation surface (3).

11. The beverage preparation device according to claim 1, wherein a housing section comprising at least a part of the insertion openings (9, 10) is part of a housing drawer (14) having a collecting bin for pomace or a serving size.

12. A method for operating a beverage preparation device (1) according to claim 1, wherein the rest device (6) is removed from one of the insertion openings (9, 10), and wherein this insertion opening (9, 10) is closed by means of the closing means (12), and wherein the rest device (6) is detachably arranged in one of the insertion openings (9, 10) while or after closing the insertion opening (9, 10).

13. The beverage preparation device according to claim 1, wherein the insertion opening (9, 10) are circumferentially closed.

14. The beverage preparation device according to claim 2, wherein, in the opening position, the closing elements (16, 17) are arranged in the housing, and wherein in the closing position, the closing elements (16, 17) are flush with the housing front side (4).

15. The beverage preparation device according to claim 3, wherein the driving means comprises energy storage means (20, 21).

16. The beverage preparation device according to claim 5, wherein the fastening means comprise permanent magnet elements and/or locking elements.

17. The beverage preparation device according to claim 8, wherein the insertion openings (9, 10) comprise identical opening cross section and have a vertical distance to each other in a vertical direction (H) extending perpendicular to the installation surface (3).

18. The beverage preparation device according to claim 10, wherein the drip tray comprises a drip grid.

19. The beverage preparation device according to claim 11, wherein the collecting bin comprise a collecting bin for capsules.

20. The method according to claim 12, wherein the rest device (6) is removed from a first one of the insertion openings (9, 10) which is automatically closed by means of the closing means (12), and wherein the rest device (6) is detachably arranged in a second one of the insertion openings (9, 10) while or after closing the first one of the insertion openings (9, 10).

\* \* \* \* \*